Figure 1:
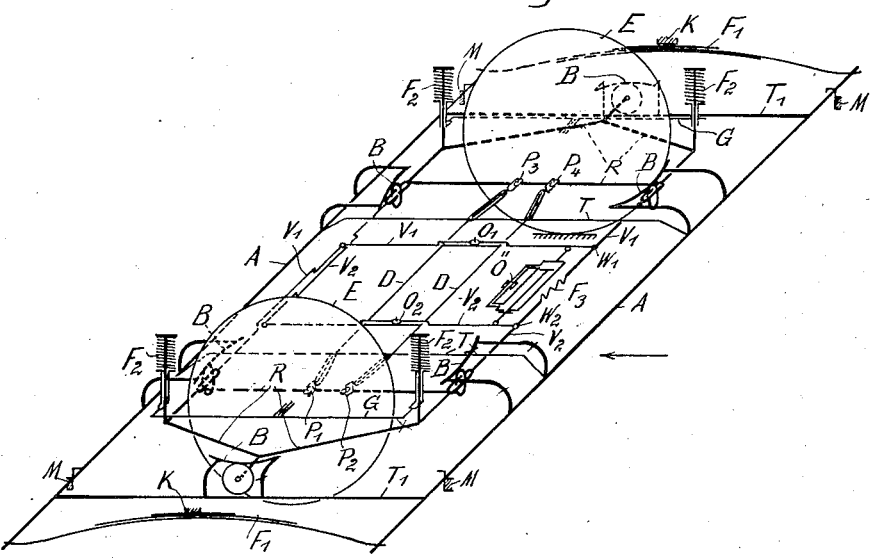

June 2, 1936.  2,042,622
LOUIS-EUGÈNE-WIDOLT MONTROSE-OSTER
GUIDE WHEEL FOR VEHICLES
Filed May 6, 1931   4 Sheets-Sheet 1

Inventor:
Louis-Eugène-Widolt Montrose-Oster
by Richards & Geier
Atty.

June 2, 1936.

LOUIS-EUGÈNE-WIDOLT MONTROSE-OSTER 2,042,622

GUIDE WHEEL FOR VEHICLES

Filed May 6, 1931 4 Sheets—Sheet 2

Inventor:
Louis Eugene-Widolt Montrose-Oster
by Richards & Geier
Atty.

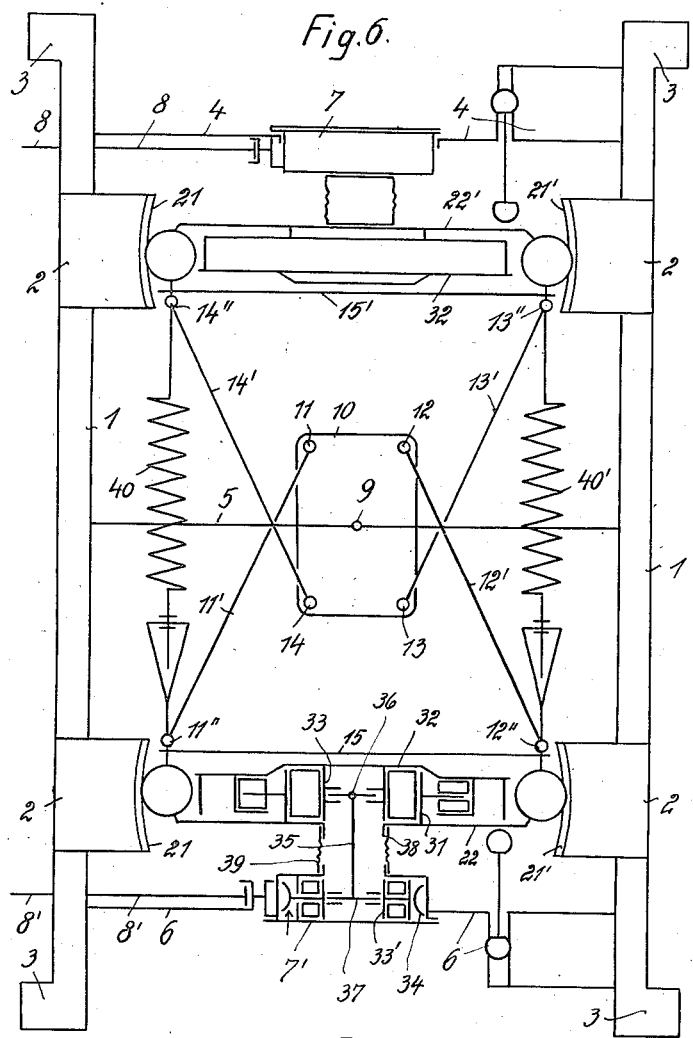
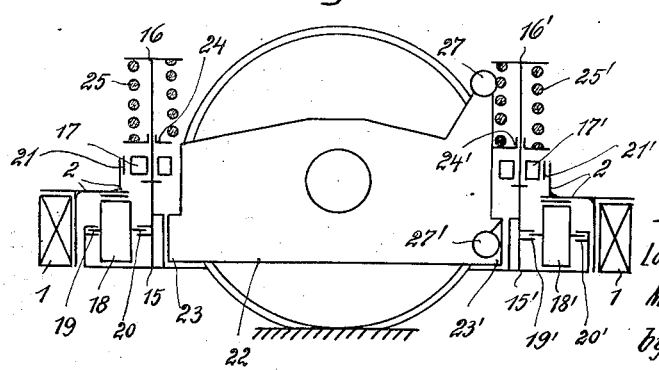

June 2, 1936.
LOUIS-EUGENE-WIDOLT MONTROSE-OSTER
2,042,622
GUIDE WHEEL FOR VEHICLES
Filed May 6, 1931 4 Sheets—Sheet 4
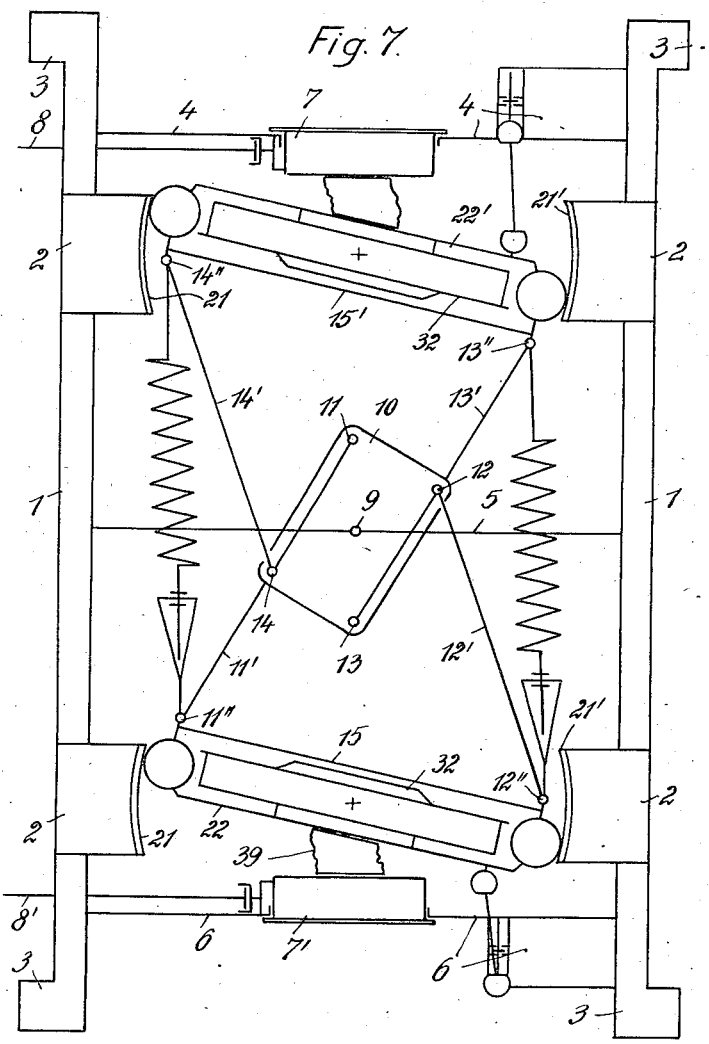
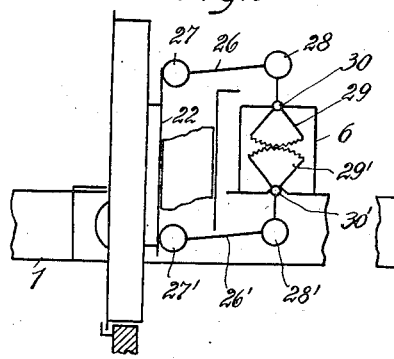
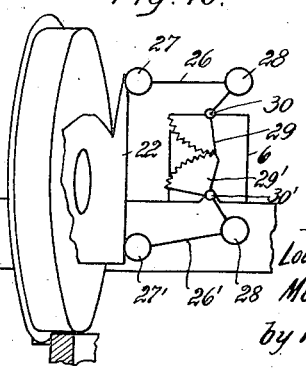
Inventor:
Louis-Eugene-Widolt
Montrose-Oster
by Richards & Geier
Atty.

Patented June 2, 1936

2,042,622

UNITED STATES PATENT OFFICE 2,042,622

GUIDE WHEEL FOR VEHICLES

Louis-Eugène-Widolt Montrose-Oster, Karlsbad, Czechoslovakia

Application May 6, 1931, Serial No. 535,532
In Germany September 10, 1929

6 Claims. (Cl. 105—169)

My invention relates to pivoted wheels for vehicles, and more especially to pivoted wheels for vehicles which travel on rails, and consists essentially in a novel construction of pivoted wheels permitting to keep constant the effective distance between the two tread circles of the wheels, that is the running gauge of the tires in one and the same truck, said distance or gauge being equal to the track gauge, while the actual distance between the planes of rotation of the wheels is increasing as a function of the displacement or swing of the wheels.

For this purpose according to my invention the guide wheels are adjusted by means of a kinematic gear in positive dependence from each other against the action of a spring provided with an additional damping device, said spring in normal position of the wheels being in released condition with the result that proper widening of the actual distance between the tires will automatically follow the swing of the bogie, the planes of rotation of the wheels, however, remaining parallel to each other and perpendicular to the plane of the rails.

In carrying out my invention essentially two groups of auxiliaries may be used with the same basic elements in either of said group of auxiliaries.

In one case every wheel is mounted in a bogie or truck which at a time is pivoted around one of two symmetrical axes. By reason of this, whenever a car enters a curve, each wheel will be automatically adjusted in dependence from the temporary radius of curvature of the rails so as to positively increase the "clear" distance between the center points of the wheels, at the same time maintaining the effective gauge of the tires which is equal to the track gauge. In guide wheels of this construction it will be possible to keep the variations of the distance between the planes of rotation of the wheels within exact limits with respect to all curvatures of the rails which may come into question. In order to warrant a uniform swing of adjacent wheels, the bogies of said wheels are connected with each other by a rod mechanism adapted to guide said wheels parallelly to each other. The wheels are furthermore carried back into their original position by the release of a single spring, the wheels consequently following the swing of the bogie against the action of the spring. A further advantage of this novel construction consists therein that the unsprung weight of the vehicle will be essentially decreased.

In another construction which forms part of my present invention wheels without axles, that is wheels without through axles and without journals are used in order to further reduce the unsprung weight. Bogies or trucks which are equipped with wheels constructed in this manner are especially suitable for street cars with a low floor passing throughout the car. The connection of the two free wheels or two groups of free wheels of one and the same bogie is effected in this construction by means of a control member in the form of a crank-disk.

Figure 3:
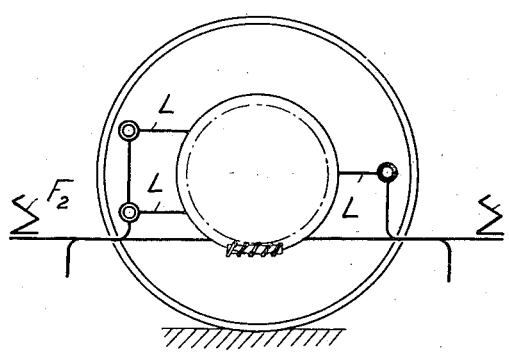
Figure 4:
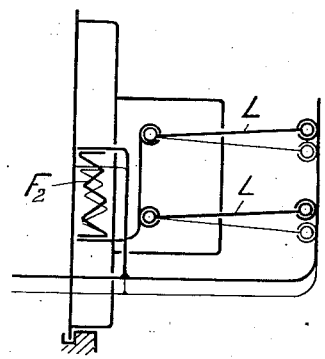
Figure 11:
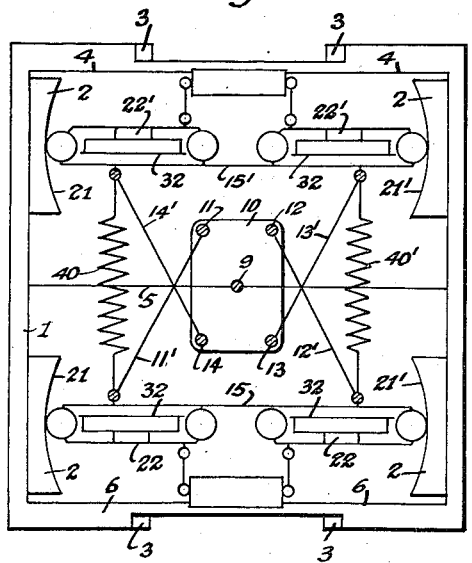
Figure 5:
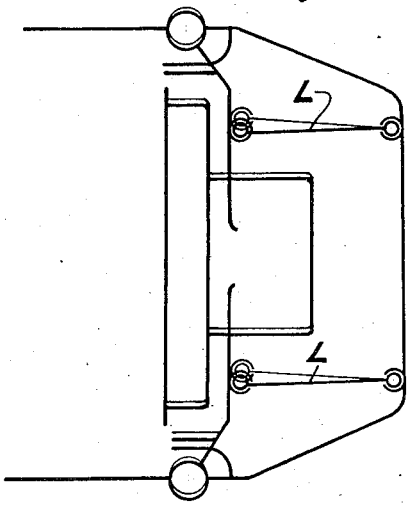

In the accompanying drawings which form part of this specification I have represented two constructions of guide wheels and the main forms of application thereof. In the drawings, Fig. 1 is a diagrammatic perspective view of one form of construction of the novel guide wheels, Fig. 2 a diagrammatic plan-view of the mechanism which serves for parallelly guiding the wheels, both of these figures relating to free wheels mounted in a bogie or truck, Figs. 3, 4 and 5 are diagrammatic views of a simplified guide mechanism for guiding the several wheels parallelly to each other, Fig. 6 is a diagrammatic top-view of a complete bogie including individual wheels without axles in normal position of the bogie, Fig. 7 a similar top-view showing the bogie of Fig. 6 in its position within a curve, Figs. 8 to 10 are diagrammatic detail views relating to Figs. 6 and 7 and Fig. 11 is a diagrammatic top-view of a bogie having two groups of wheels of the tandem type.

Figure 2:
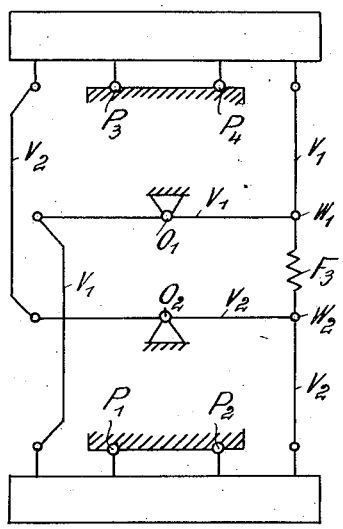

From Figs. 1 and 2 it may be seen that the body of the vehicle rests at the points designated with K upon two leaf-springs $F_1$, $F_1$, set of leaf-springs being provided for each set of wheels. The leaf-springs $F_1$, $F_1$ are mounted on a frame A, A, $T_1$, $T_1$, T, T, the interior transverse rods T thereof being connected with each other symmetrically with respect to the transverse central axis of the bogie by two transoms D. The middle parts of said transoms D are directed parallelly, while the end portions thereof form an angle with each other.

The frame A, A, $T_1$, $T_1$, T, T, carries at either end thereof three roller planes B for the rollers of the bogies R. Within the gauge of the wheels the bogies are pivotally connected at two points $P_1$, $P_2$ and $P_3$, $P_4$ thereof with the transoms D. This connection is such that according to the direction of swinging motion only the one of the connecting points is always kept relatively stationary, the axis of the swing of the bogie passing through this point. For instance, the ends of the transoms D may be hollow as shown in the drawing and pins fulcrumed to the bogie, said pins sliding within the hollow ends of the transoms D and being prevented from entering the hollow ends of said transoms D further than would correspond to the normal position of the wheel. During swinging motion of the wheel one of said pins is being drawn out of the hollow end of the transom, while the other of said pins forms the axis of rotation for the bogie. Besides, the spur-shaped bogies R are provided in either plane of the wheels with two perpendicular bolts. Upon these bolts are mounted the transverse rods G which carry the bearings and the guide mechanism for the wheels. Said bearings and guide mechanism will thus be permitted to move in vertical direction, motion being damped out by the springs $F_2$. The two bogies R are connected with each other by the guide rods $V_1$, $V_2$, said guide rods serving for parallelly guiding the bogies and being mounted at the points $O_1$ and $O_2$ on the frame. Intermediate the points $W_1$ and $W_2$ of said guide rods there is positioned a retracting spring $F_3$ as well as an oil damper O" with a regulating valve to prevent so-called rolling motion of the wheels.

In order to provide possibilities for a proper swinging motion, the roller planes B are composed of two different circular roller races, the center points of said circular races being positioned at $P_1$ and $P_2$ for the wheel which as shown in the drawing is positioned at the left, while for the wheel at the right the center-points of said circular races are positioned at $P_3$ and $P_4$. As shown in the drawings, all parts of the structure, with the exception of the free wheels and the transverse rods G, are resiliently supported by the four springs $F_2$, a second spring suspension by means of leaf-springs being provided for the body of the vehicle or car. M are stops fixed to the body of the car, said stops serving for limiting the stroke of the relative motion between the body and the framework $AT_1$ $AT_1$.

The aforedescribed construction operates as follows:

If the car enters a right-hand curve in a direction of travel as indicated by the arrow in Fig. 1, the wheel at the right-hand side, assuming a street car rail, will run with its flange against the side wall of the groove of the rail and the wheel at the left-hand side against the profile of the rail. The wheel at the left-hand side, therefore, will be turned together with its bogie around the point $P_1$ towards the right and the wheel at the right-hand side in unison therewith around the point $P_4$. In case of a railway rail the wheel at the right-hand side will be turned immediately by the rod mechanism $V_1$, $V_2$ in like manner, the wheel at the left-hand side during turning in this manner exerting a pressure on said rod mechanism to move the latter towards the right, said rod mechanism now turning around the fixed point $O_1$ and pulling the righthand wheel around the swivel point $P_4$ towards the inside. On the other hand, the wheel at the left-hand side on account of its turning motion around the point $P_1$ will have drawn the rod mechanism $V_2$ towards the left around the point $O_2$ thereby turning the wheel on the right-hand side towards the right, with respect to the direction of travel, around the point $P_4$. Both wheels, accordingly, will be positively turned in unison. As may be seen from the drawings, the point $W_1$ of the rod mechanism $V_1$ and the point $W_2$ of the rod mechanism $V_2$ move different distances, in other words, the spring $F_3$ will be tensioned. This tension of the spring $F_3$ will come into effect, as soon as the counter-pressure of the rails in a curve ceases, that is whenever the car travels on a straight track in which case the wheels will automatically be turned back into their initial position.

Upon entering a curve in left-hand sense the wheels, accordingly, will turn around the points $P_3$ and $P_2$ as the centers of rotation.

The transverse rods G in this construction are resiliently mounted with respect to the spur-shaped frames R, the resilient means consisting of coil springs $F_2$, and more particularly in such a manner that the spur-shaped bogie is equipped with two vertical extensions parallel to each other upon which extensions the transverse beams G may move in vertical direction in automatically maintained parallel position with respect to each other. This construction can only be used in case no torque is exerted upon the transverse rods G.

This, however, is not the case, if either the brakes or the gear-casing are fixed to the transverse rod G. In an arrangement of this kind parallel guiding of the wheels must be effected in a manner permitting not only a displacement of the wheels in vertical direction with respect to the bogie, but also reception of the aforementioned torque. This may be accomplished according to Figs. 3, 4 and 5 by connecting the bogie with the wheel-casing by three guide rods L of the form of ball-joints permitting said wheel-casing to make all necessary motions with respect to the bogie. These relative motions may either take place in vertical direction against the action of the springs, or in horizontal direction in lagging or leading sense within the limits of the stops, or also in the form of a rotation due to the reception of the torque arising during starting and braking. These relative motions are always directed against the action of the coil springs $F_2$.

Figs. 6 to 10 show a bogie with a control or guide member in the form of a crank disk for one pair of wheels on the bogie. Fig. 11 shows an equivalent arrangement of a bogie and wheel system with a crank disk as guide member in connection with a modified construction in which every bogie comprises two pairs of wheels arranged in tandem, instead of two individual oppositely positioned wheels.

Since the amount of turning motion of tandem wheels must be kept within relatively narrow limits, each pair of tandem wheels may be mounted below a seat of the car permitting to also equip cars having some greater length—which otherwise could only be constructed as cars with four axles and a relatively high floor—with the novel bogie construction which may be designated as a bogie of the cut open type.

In the present case the frame proper of the bogie consists of two rods or beams 1 positioned transversely to the car, said rods or beams being equipped with horizontal as well as vertical races 2 and with ends 3 supporting leaf-springs (not shown for the sake of simplicity), the body of the car thus resting upon said leaf-springs. The two rods or beams 1 are rigidly connected with each other by means of the transoms 4, 5 and 6 shown in the upper, middle and under part of Fig. 6. Rigidly connected to the outer transoms 4 and 6 are worm gear casings 7 and 7', Cardan shafts 8 and 8' leading from the worms of said worm gear casings towards the driving motors which are mounted in known manner on the body of the car. The leaf-springs (not shown) which rest on the ends 3 of the rods will therefore permit the bogie and therewith the worm, the worm gear, as well as the worm gear casing to move only in a vertical plane with respect to the driving motors in accordance with the degree of resiliency of the springs. On the middle transom 5 there is provided a crank disk 10 rotatable around the center-point 9 which is positioned in the central axis of the bogie. The crank disk 10 is connected at four points 11, 12, 13 and 14 thereof with one end of the four symmetrically arranged guide rods 11', 12', 13' and 14', respectively, said guide rods being connected at their other ends with bridges 15 and 15'; for instance, two of said rods 11' and 12' are connected with the points 11" and 12" of the bridge 15 which extends around the wheel and carries two vertical extensions in the form of rods 16 and 16' provided with spring sockets. The rods 16 and 16' are equipped with rollers 17 and 17', respectively, which are rotatable around said rods at the height of the central axis of the wheel. The bridge 15 furthermore is provided within the plane of the wheels with two further rollers 18 and 18' having a horizontal axis of rotation, the journals of said rollers being mounted at 19 and 20 and 19' and 20'. The rollers 18 and 18' serve to support the weight of the bogie and of the entire body of the car and rest on their part upon the under surface of the roller races 2 on which they may roll off. The rollers 17 and 17' are in contact with the roller races 21 and 21' at the members 2 and serve as catches.

Similar to the catches used in connection with axle sleeves of ordinary construction the bridge engages with the plate 22 which is mounted slidingly in vertical direction on said bridge and with extensions or catches 23, 23'. This plate 22 is provided with perforated extensions 24 and 24' through which the rods 16 and 16' pass for pressing the springs 25 and 25' against the spring sockets on said rods. 26 and 26' are guides having spherical ends engaging at the points 27 and 27' with the plate 22 as well as at the points 28 and 28' with the toothed segments 29 and 29' which on their part are mounted on the transverse rod 6 rotatably around the points 30 and 30' of which one is vertically positioned above the other. Instead of this arrangement straight guiding of the wheels may evidently also be effected by means of three guide rods of which two are positioned in a vertical plane.

The plate 22 is equipped with a cylindrical projection 31 carrying bearings similar to the front wheel bearings of automobiles, said bearings serving for the reception of the wheel 32. The wheel 32 itself is provided with a cylindrical recess 33 positioned within the plane of rotation of said wheel. A like cylindrical central recess 33' is provided on the usually employed oppositely positioned worm gear 34. Connection between said cylindrical recess 33 on the wheel 32 and the cylinder 33' of the worm gear 34 is effected by a Cardan or universal joint of ordinary construction permitting the following motions of said wheel with respect to the worm gear: Firstly, to move in vertical direction, secondly, to approach said worm gear with its center 36, and thirdly, to swing around an axis perpendicular to the plane of the drawing, this axis being likewise perpendicular to the common central axis of the bogie and of the free wheels and moving along said central common axis in direction towards the worm gear casing.

Intermediate the worm gear 7' and the cylindrical part 38 of the plate 22 there is interposed a leather cuff 39 as a protection for the Cardan drive against entrance of oil.

Retracting springs 40 and 40' are provided intermediate the points 11" and 14" on the one hand and the points 12" and 13" on the other hand, said retracting springs being of shortest length as shown in Fig. 6 and expanded according to Fig. 7. Eventually a suitable damping device may be inserted at this place.

In Fig. 11 which shows a construction of a bogie having two wheels arranged in tandem with respect to either rail the bridges 15 and 15' are properly extended to reach around two wheels of the tandem arrangement. Accordingly, these bridges will have four points of support. The points at which the bridges engage with the connecting rods of the crank disk remain unchanged as compared with a bogie having only two wheels. Moreover, Fig. 11 shows that in principle the arrangement remains fully unchanged, irrespective of the fact whether the bogie comprises two or four wheels. For the sake of not unnecessarily complicating the drawing the guide mechanism proper is omitted from Fig. 11.

As regards the last-mentioned connecting rods, I desire of being understood that also three or more connecting rods may be used in conjunction with the crank disk and that said connecting rods, in addition, may also be arranged crosswise with respect to each other. The guide mechanism proper may also consist of a plurality of crank disks or similar elements.

Although in the foregoing specification I have preferred to describe my novel bogie and guide wheel construction in connection with cars or other vehicles which travel on rails, it will be evident from the herein given explanations that my novel construction may also advantageously be used in connection with street cars for passenger service or in connection with freight cars or wagons, trolley busses, automobiles, autobusses and similar vehicles. In every particular case the bogie and wheel construction may be modified to meet special requirements.

The directions and explanations given hereinabove will enable anyone skilled in the art to construct my present bogie and guide wheels.

In general it is preferable when constructing the bogie and wheels to entirely dispense with through axles as well as with wheel journals in particular. By this the valuable advantage will be attained that cars or vehicles equipped with my present guide wheels may be constructed with a floor which extends in horizontal direction throughout the length of the car or vehicle at the height of a single step above the surface of the street, at the same time permitting to reduce the unsprung weight of the car to a minimum. An essential technical progress will therefore immediately result in every case, when employing my new construction. My present invention, however, may also be used with advantage in connection with cars or vehicles of the ordinary construction in which through axles are employed. In this case my invention may be used in connection with cars or vehicles having telescopic axles, that is axles which may be lengthened and shortened in accordance with demand by inserting one part of the axle into the other or by drawing one part out of the other in the manner of a telescope. In cars or vehicles having telescopic axles it will also be possible when using the constructions forming part of my present invention to keep the frictional resistance between the wheels and the rails at a minimum value, said frictional resistance being necessarily present on account of the automatic adjustment of the distance between pairs of oppositely positioned wheels during travel along a curve. Furthermore the advantages of my bogie and wheel construction will likewise be present, if the adjustment of the wheels is effected by hand, by the aid of a servo-motor or similar adjusting means.

Finally I desire of being understood that single elements or combinations of several elements which form part of the construction according to my present invention, such as for instance the mechanism for parallelly guiding the wheels or the guide rods, represent novel and advantageous individual constructions. I, therefore, aim in the appended claims to cover all those elements or combinations of elements of my present construction which I believe are new and useful and which result in novel advantages not present in known constructions.

I claim:

1. A vehicle, comprising in combination a plurality of frames, a pair of wheels, each wheel being mounted in one of said frames, two symmetrically disposed axes, means for swinging said frames with their respective wheels around one of said axes, and guide means for parallelly guiding said frames, the last-mentioned means maintaining the same length of the gauge during the passage of the vehicle through a curve.

2. A vehicle in accordance with claim 1, wherein said guide means comprise two pins to control the swinging motion of each of said frames during passage of the vehicle through a curve, and guides for said pins to arrest one of said pins and permit full swinging motion of the other of said pins in one direction of swing of said frames and to arrest the second-mentioned pin and permit free swinging motion of the first-mentioned pin in the other direction of swing of said frame.

3. A truck for vehicles, comprising in combination a plurality of frames, a pair of wheels mounted in said frames, means for swinging said wheels independently of the position of the truck but parallel to each other, and a guide mechanism for maintaining a constant running gauge, said guide mechanism comprising means for increasing the distance between the center points of rotation of said wheels in dependence from the angle of swing of said wheels in said truck, two rods, and one single spring situated between said rods, said spring being released in the normal position of the wheels and being adapted to pull back said frame in the normal position after said wheels were compelled to swing out.

4. A truck for vehicles, comprising in combination a plurality of frames, a pair of wheels mounted in said frames, means for swinging said wheels independently of the position of the truck but parallel to each other, a guide mechanism for maintaining a constant running gauge, said guide mechanism comprising means for increasing the distance between the center points of rotation of said wheel in dependence from the angle of swing of said wheels in said truck; a plurality of rollers, each of said frames being mounted on three rollers, a journal for each of said wheels, a bridge acting as a bearing for said journal, and resilient means interposed between said bridge and one of said frames.

5. A truck for vehicles, comprising in combination a plurality of frames, a pair of wheels pivotably mounted in said frames, a guide mechanism interposed between said wheels and said truck, whereby said wheels may be moved in parallel planes independently of the position of the truck, the connecting points of said guide mechanism with said truck being so selected as to keep constant the running gauge of said pair of wheels, the distance between the center points of rotation of said wheels being increased in dependence from the angle of the swing of said wheels in said truck.

6. A truck for vehicles, comprising in combination a frame, a pair of wheels pivotally mounted in said frame, a guide mechanism interposed between said wheels and said truck whereby said wheels may be swung in parallel planes independently of the position of the truck, said guide mechanism comprising a plurality of levers pivoted in said frame, the pivot points being so selected as to keep constant the running gauge of said pair of wheels, the distance between the center points of rotation of said wheels being increased in dependence from the angle of the swing of said wheels in said truck.

LOUIS-EUGÈNE-WIDOLT
MONTROSE-OSTER.